United States Patent
Park et al.

(10) Patent No.: US 9,414,413 B2
(45) Date of Patent: Aug. 9, 2016

(54) METHOD AND DEVICE FOR TRANSMITTING A FRAME USING A MULTIPLE PHYSICAL LAYER IN A WIRELESS LAN SYSTEM

(75) Inventors: Jong Hyun Park, Anyang-si (KR); Ill Soo Sohn, Anyang-si (KR); Eun Sun Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 162 days.

(21) Appl. No.: 14/124,626

(22) PCT Filed: Jun. 4, 2012

(86) PCT No.: PCT/KR2012/004377
§ 371 (c)(1),
(2), (4) Date: Jan. 15, 2014

(87) PCT Pub. No.: WO2012/169751
PCT Pub. Date: Dec. 13, 2012

(65) Prior Publication Data
US 2014/0140333 A1    May 22, 2014

Related U.S. Application Data

(60) Provisional application No. 61/494,876, filed on Jun. 8, 2011.

(51) Int. Cl.
H04W 74/08    (2009.01)
H04W 84/12    (2009.01)

(52) U.S. Cl.
CPC ........ *H04W 74/085* (2013.01); *H04W 74/0816* (2013.01); *H04W 84/12* (2013.01)

(58) Field of Classification Search
CPC ..................... H04W 74/0816; H04W 74/085

USPC .......................................................... 370/338
See application file for complete search history.

(56) References Cited

U.S. PATENT DOCUMENTS

2002/0061031 A1* 5/2002 Sugar et al. ................... 370/466
2002/0158801 A1* 10/2002 Crilly, Jr. ................ G01S 13/74
                                                        342/378

(Continued)

FOREIGN PATENT DOCUMENTS

KR    10-2006-0103937    10/2006
KR    10-2007-0062893     6/2007

(Continued)

OTHER PUBLICATIONS

Bellado, John. "Media Access Vulnerabilities" USENIX Security Symposium. Aug. 2003.*

(Continued)

*Primary Examiner* — Jason Mattis
*Assistant Examiner* — Stephen J Clawson
(74) *Attorney, Agent, or Firm* — Lee, Hong, Degerman, Kang & Walmey; Jonathan Kang; Michael Monaco

(57) ABSTRACT

The present invention relates to a method for transmitting a frame, which is performed by a transmission station in a wireless LAN system that supports frame transmission and reception on the basis of a first physical layer and a second physical layer. The method comprises the steps of: transmitting a request-to-send (RTS) to a reception station through the first physical layer of the transmission station; receiving, by the reception station, a first clear-to-send (CTS) frame transmitted through the first physical layer of the reception station in response to the RTS frame; and transmitting a second CTS frame through the second physical layer of the transmission station, then transmitting a data frame through the first physical layer of the transmission station.

9 Claims, 8 Drawing Sheets

(56) References Cited

U.S. PATENT DOCUMENTS

| | | | |
|---|---|---|---|
| 2002/0172186 A1* | 11/2002 | Larsson | 370/349 |
| 2003/0227934 A1* | 12/2003 | White et al. | 370/432 |
| 2004/0030897 A1* | 2/2004 | Hua et al. | 713/170 |
| 2004/0229566 A1* | 11/2004 | Wang et al. | 455/63.1 |
| 2005/0002364 A1* | 1/2005 | Ozer et al. | 370/338 |
| 2005/0089005 A1* | 4/2005 | Sakoda et al. | 370/348 |
| 2005/0105504 A1* | 5/2005 | Sakoda | 370/349 |
| 2005/0147112 A1* | 7/2005 | Sugaya | 370/418 |
| 2005/0169232 A1* | 8/2005 | Sakoda et al. | 370/347 |
| 2006/0072492 A1* | 4/2006 | Trainin | 370/328 |
| 2006/0114941 A1* | 6/2006 | Silverman et al. | 370/503 |
| 2007/0091824 A1* | 4/2007 | Budampati et al. | 370/255 |
| 2009/0059824 A1* | 3/2009 | Wentink | H04W 74/0816 370/310 |

FOREIGN PATENT DOCUMENTS

| | | |
|---|---|---|
| KR | 10-0728039 | 6/2007 |
| KR | 10-2008-0099602 | 11/2008 |
| KR | 10-2010-0105308 | 9/2010 |
| KR | 10-1096419 | 12/2011 |

OTHER PUBLICATIONS

Korean Intellectual Property Office Application Serial No. 10-2013-7032414, Notice of Allowance dated Feb. 25, 2015, 2 pages.

* cited by examiner

METHOD AND DEVICE FOR TRANSMITTING A FRAME USING A MULTIPLE PHYSICAL LAYER IN A WIRELESS LAN SYSTEM

CROSS-REFERENCE TO RELATED APPLICATIONS

This application is the National Stage filing under 35 U.S.C 371 of International Application No. PCT/KR2012/004377, filed on Jun. 4, 2012, which claims the benefit of U.S. Provisional Application Ser. No. 61/494,876, filed on Jun. 8, 2011, the contents of which are all hereby incorporated by reference herein in their entirety.

BACKGROUND OF THE INVENTION

1. Field of the Invention

The present invention relates to wireless communication and more particularly, a method for transmitting a frame using multiple physical layers in a wireless LAN system.

2. Related Art

Along with the advancement of information and communication technologies, various kinds of wireless communication technologies are under development. Of these, wireless local area network (WLAN) technology, which utilizes wireless frequency technology, enables users to connect to the Internet wirelessly at their home, their workplace, or at a particular service area by using their portable device such as a personal digital assistant (PDA), a laptop computer, and a portable multimedia player (PMP).

Since the IEEE (Institute of Electrical and Electronics Engineers).802, which is a standards developing organization (SDO) for WLAN technology, was established on February, 1980, a lot of standardization tasks are being carried out. The initial WLAN specification supported a speed of 1 to 2 Mbps through frequency hopping, band spreading, and infrared communication by using a frequency of 2.4 GHz according to the IEEE 802.11 standards, and recent specifications are capable of supporting a maximum speed of 54 Mbps by using Orthogonal Frequency Division Multiplexing (OFDM). In addition, the IEEE 802.11 working group is developing standards of various technologies such as improvement of Quality of Service (QoS), Access Point (AP) protocol compatibility, security enhancement, radio resource measurement, wireless access vehicular environments, fast roaming, a mesh network, interworking with an external network, and wireless network management.

The basic access mechanism of the IEEE 802.11 MAC (Medium Access Mechanism) uses the CSMA/CA (Carrier Sense Multiple Access with Collision Avoidance) mechanism combined with a binary exponential backoff. The CSMA/CA mechanism is also called a distributed coordination function (DCF) of the IEEE 802.11 MAC and adopts the "listen before talk" mechanism by default. In this type of connection mechanism, a station (STA) listens to a radio channel or a medium prior to starting transmission. As a result of the listening, if it is found that the medium is not in use, the listening station starts its own transmission. On the other hand, if the medium is in use, the station enters a delay period determined by the binary exponential backoff algorithm rather than start its own transmission.

The CSMA/CA mechanism supports virtual carrier sensing in addition to physical carrier sensing whereby the station listens to a medium directly. Virtual carrier sensing is intended to compensate for limitations of physical carrier sensing such as a hidden node problem. To implement virtual carrier sensing, the IEEE 802.11 MAC (Medium Access Control) employs a network allocation vector (NAV). Suppose an STA currently uses a medium or has a right to use the medium. The STA then makes use of the NAV to inform the other STAs about the remaining time before the medium is available again. Therefore, a value carried by the NAV corresponds to a time period during which the medium is supposed to be used by the STA which transmits the corresponding frame.

Configuration of the NAV requires a procedure of exchanging RTS (Request To Send) frame and CTS (Clear To Send) frame. The RTS and CTS frame contain information which informs reception STAs about upcoming frame transmission and which can be used for delaying transmission of frames by the reception STAs. The information can be carried by, for example a duration field of the RTS and the CTS frame. Once exchange of the RTS and the CTS frame is carried out, a source STA transmits an actual frame to a destination STA.

SUMMARY OF THE INVENTION

An objective of the present invention is to provide a method for transmitting a frame using multiple physical layers in a wireless LAN system.

In an aspect, a method for transmitting a frame, which is carried out by a transmission station in a wireless LAN system supporting transmission and reception of a frame based on a first and a second physical layer is provided. The method includes transmitting an Request To Send (RTS) frame to a reception station through a first physical layer of the transmission station, receiving a first Clear To Send (CTS) frame transmitted in response to the RTS frame by the reception station through a first physical layer of the reception station, transmitting a second CTS frame through a second physical layer of the transmission station, and transmitting a data frame through the first physical layer of the transmission station.

The first CTS frame may include information about time required for transmission of the second CTS frame and the data frame.

The second CTS frame may include information about time required for transmission of the data frame.

The RTS frame may include transmission time information indicating the reception station about transmission time of the data frame.

The transmission time information may include information about time required for transmission of the second CTS frame.

The first and the second CTS frame may be broadcast.

In another aspect, a method for receiving a frame, which is carried out by a reception station in a wireless LAN system supporting transmission and reception of a frame based on a first and a second physical layer, is provided. The method comprising receiving an Request To Send (RTS) frame transmitted from a transmission station through a first physical layer of the transmission station, transmitting a first Clear To Send (CTS) frame in response to the RTS frame through the first physical layer of the reception station, transmitting a second CTS frame in response to the RTS frame through a second physical layer of the reception station. and receiving a data frame transmitted through the first physical layer of the transmission station.

The first CTS frame may include information about time required for transmission of the second CTS frame and the data frame.

The second CTS frame may include information about time required for transmission of the data frame.

The RTS frame may include information about time required for transmission of the data frame.

In still another aspect, a transmission station which transmits a frame based on a first and a second physical layer is provided. The transmission station includes a processor. The processor is configured to transmit a Request To Send (RTS) frame to a reception station through a first physical layer of the transmission station, receive a first Clear To Send (CTS) frame which is transmitted in response to the RTS frame by the reception station through a first physical layer of the reception station, transmit a second CTS frame through a second physical layer of the transmission station, and transmit a data frame through the first physical layer of the transmission station.

The first CTS frame may include information about time required for transmission of the second CTS frame and the data frame.

The second CTS frame may include information about time required for transmission of the data frame.

According to an embodiment of the present invention, a hidden node problem among individual stations using separate physical layers in a wireless LAN system based on multiple physical layers is solved, thereby reducing the chance of collision during frame transmission. Also, since a plurality of physical layers available can be adaptively utilized depending on a target station, throughput of the entire system can be increased.

DESCRIPTION OF EXEMPLARY EMBODIMENTS

In what follows, a method for accessing a layered channel and an apparatus supporting the method will be described in detail with reference to appended drawings.

Figure 1:
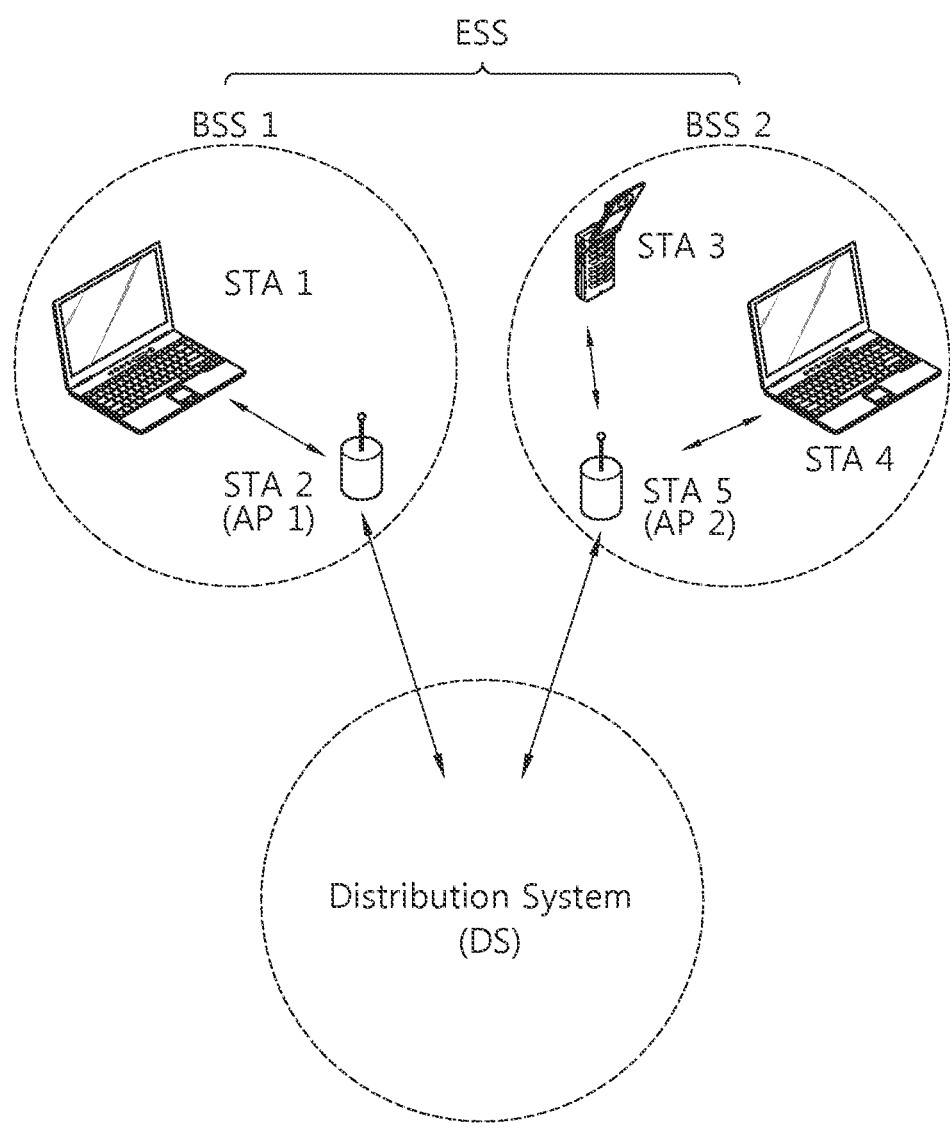
FIGS. 1 and 2 illustrate respectively a simplified structure of one example of a wireless LAN system to which an embodiment of the present invention can be applied.
Figure 2:
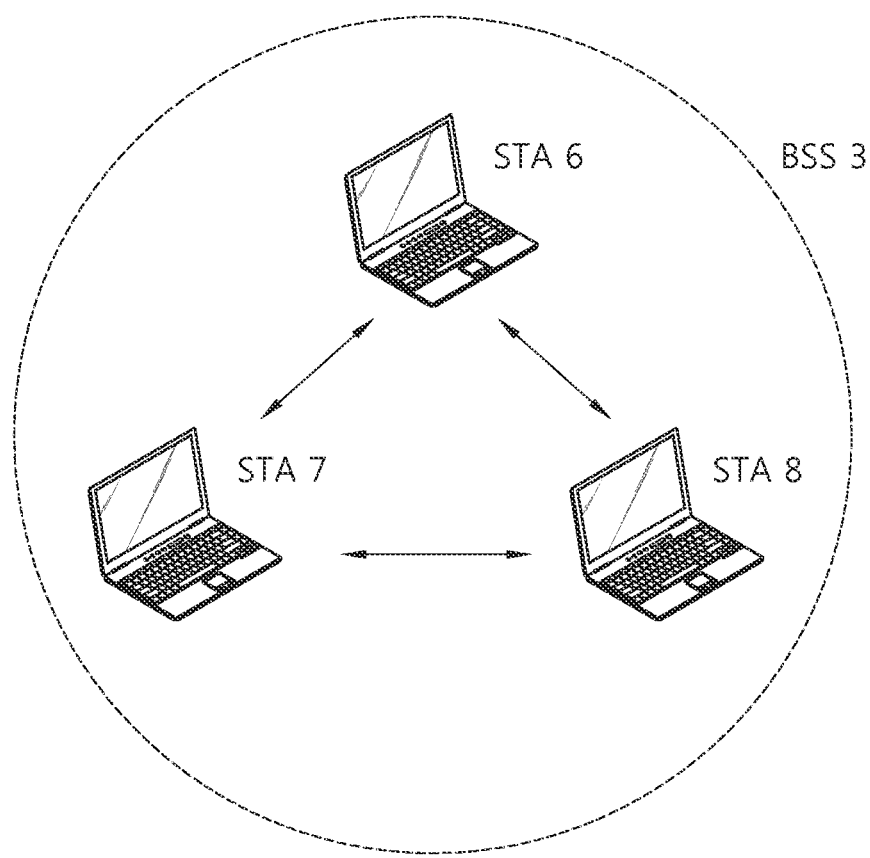

FIGS. 1 and 2 illustrate respectively a simplified structure of one example of a wireless LAN system to which an embodiment of the present invention can be applied.

With reference to FIGS. 1 and 2, a wireless LAN system includes one or more basic service sets (BSSs). A BSS refers to a set of stations (STAs) which have been synchronized successfully and thus can communicate with each other, but is not a term meant for a particular area. The BSS can be classified into an infrastructure BSS and an independent BSS (IBSS); the former is shown in FIG. 1 while the latter is shown in FIG. 2. The infrastructure BSSs (BSS1, BSS2) include one or more STAs (STA1, STA3, and STA4), access points (APs) which are STAs providing a distribution service, and a distribution system (DS) connecting a plurality of APs (AP1 and AP2). On the other hand, the IBSS does not include APs, and thus all STAs are mobile STAs (STA6, STA7, and STA8). In addition, the IBSS constitutes a self-contained network since connection to the DS is not allowed.

The STA is an arbitrary functional medium including a medium access control (MAC) and wireless-medium physical layer (PHY) interface conforming to the IEEE 802.11 standard, and in a broad sense, STAs include AP and non-AP stations. An STA for wireless communication includes a processor and a transceiver, and can further include a user interface, a display means, and so on. The processor is a functional unit devised to generate a frame to be transmitted through a wireless network or to process a frame received through the wireless network, and performs various functions to control STAs. The transceiver is functionally connected to the processor and is a functional unit devised to transmit and receive a frame for the STAs through the wireless network.

Among the STAs, non-AP STAs (STA1, STA3, STA4, STA6, STA7, and STA8) are portable terminals operated by users. A non-AP STA may be simply referred to as an STA. The non-AP STA may also be referred to as a wireless transmit/receive unit (WTRU), a user equipment (UE), a mobile station (MS), a mobile terminal, or a mobile subscriber unit.

The AP (AP1 and AP2) is a functional entity for providing connection to the DS through a wireless medium for an associated STA. Although communication between non-AP STAs in an infrastructure BSS including the AP is performed via the AP in principle, the non-AP STAs can also perform direct communication when a direct link is set up. The AP may be referred to as a centralized controller, a base station (BS), a node-B, a base transceiver system (BTS), or a site controller in addition to the term of access point.

A plurality of infrastructure BSSs can be interconnected by the use of the DS. An extended service set (ESS) is a plurality of BSSs connected to each other by the use of the DS. STAs included in the ESS can communicate with each other, and within the same ESS, a non-AP STA can move from one BSS to another BSS while communicating in a seamless manner.

The DS is a mechanism whereby one AP communicates with another AP. By using the DS, an AP can transmit a frame for STAs associated with a BSS managed by the AP, or transmit a frame when any one of the STAs moves to another BSS, or transmit a frame to an external network such as a wired network. The DS is not necessarily a network, and has no limitation in its form as long as a predetermined distribution service specified in the IEEE 802.11 can be provided. For example, the DS may be a wireless network such as a mesh network, or may be a physical structure for interconnecting APs.

Figure 3:
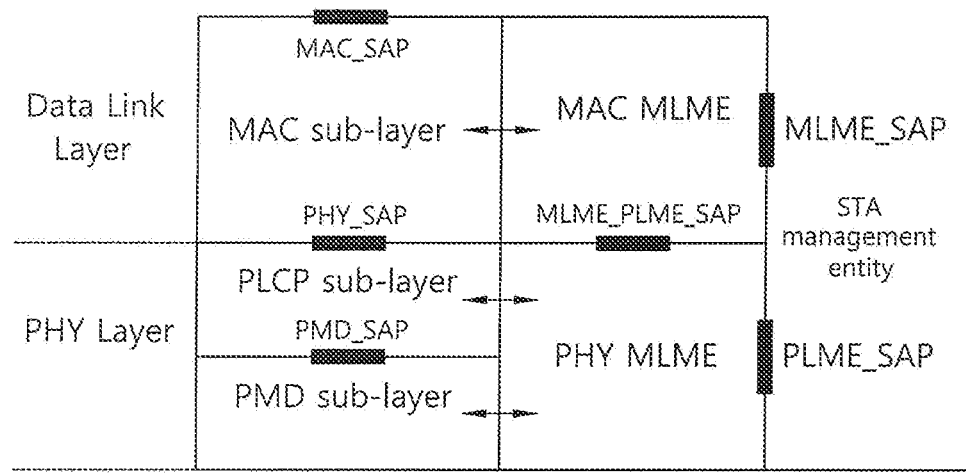
FIG. 3 illustrates the architecture of a physical layer according to the IEEE 802.11 standards.

FIG. 3 illustrates the architecture of a physical layer according to the IEEE 802.11 standards.

The PHY layer architecture of the IEEE 802.11 comprises PLME (PHY Layer Management Entity), PLCP (Physical Layer Convergence Procedure) sub-layer, and PMD (Physical Medium Dependent) sub-layer. The PLME, in cooperation with MLME (MAC Layer Management Entity), provides a management function of the physical layer. The PLCP sub-layer, located between the MAC sub-layer and the PMD sub-layer, delivers an MPDU (MAC Protocol Data Unit) received from the MAC sub-layer to the PMD sub-layer according to a command of the MAC layer, or delivers a frame received from the PMD sub-layer to the MAC sub-layer. The PMD sub-layer belongs to a lower layer of the PLCP and is responsible for transmission and reception of a physical layer entity between two stations through a wireless medium.

The PLCP sub-layer, while receiving the MPDU from the MAC sub-layer and delivering the received MPDU to the PMD sub-layer, adds an additional field including information required for a physical layer transceiver. The additional field for the MPDU may be a PLCP preamble, a PLCP header and tail bits required for a data field. The PLCP preamble is used for preparing a receiver for a synchronization function and an antenna diversity before a PSDU (PLCP Service Data Unit) is transmitted. The PLCP header may have fields carrying information about a frame.

In the PLCP sub-layer, a PPDU (PLCP Protocol Data Unit) is generated by adding the aforementioned fields to the MPDU, and the PPDU is transmitted to a reception station through the PMD sub-layer. The reception station receives the PPCU and obtains information required for data reconstruction from the PLCP preamble and PLCP header, thereby reconstructing data.

The present invention relates to a wireless LAN system employing multiple physical layers (PHYs). In what follows, it is assumed that all or part of STAs constituting a BSS can transmit a frame delivered from an upper layer by using a plurality of physical layers.

Figure 4:
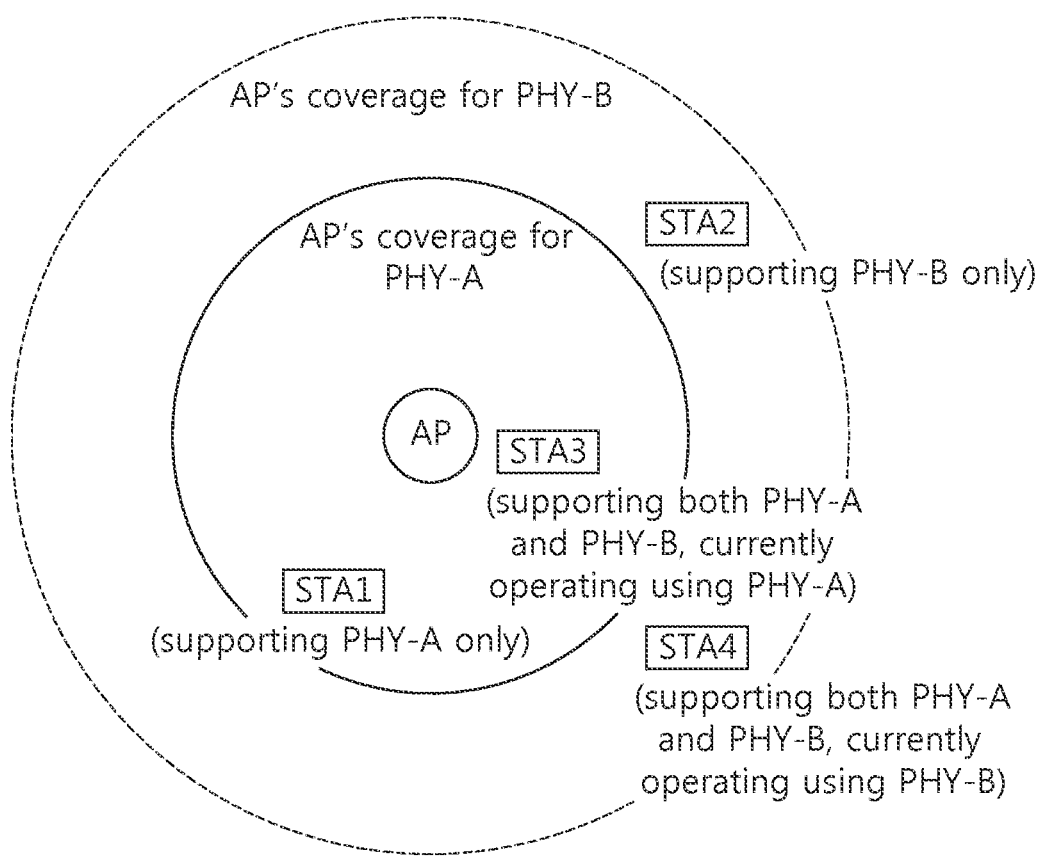
FIG. 4 illustrates one example of a structure of a WLAN system which utilizes multiple physical layers.

FIG. 4 illustrates one example of a structure of a WLAN system which utilizes multiple physical layers. In the example of FIG. 4, transmission and reception of a frame using PHY-A and PHY-B is possible. FIG. 4 illustrates an example where STA1 to STA4 constitute a BSS managed by an AP, and STA1 denotes a station supporting PHY-A only while STA2 is a station supporting PHY-B only. And, the STA 3 and STA 4 are STAs supporting PHY-A and PHY-B. It is further assumed that STA3 uses PHY-A and STA4 uses PHY-B for frame transmission and reception. The area in FIG. 4 indicated by a solid line represents the coverage of an AP at the time of frame transmission based on PHY-A while the area indicated by a dotted line represents the coverage of an AP at the time of frame transmission based on PHY-B. In what follows, the coverage of an AP is defined by the maximum reachable distance at which a signal can be received when the AP transmits a frame at a minimum supported rate, and the area indicated by a solid line is called coverage A while the area indicated by a dotted line coverage B. In the example of FIG. 4, PHY-B provides a wider coverage than PHY-A. The PHY-A is able to support relatively short transmission range and a relatively high transmission rate than the PHY-B. The difference between the PHY-A and the PHY-B is made by various causes such as characteristics of frequencies used by individual physical layers, transmission rate, and characteristics of a transmission method.

Inside the coverage A, there may exist several STAs supporting the PHY-A only, which is denoted by STA1 in FIG. 4. Similarly, the coverage B may include several STAs supporting the PHY-B only, denoted by STA2 in FIG. 4. STA1 cannot perform decoding of a frame based on the PHY-B, and STA2 cannot perform decoding of a frame based on the PHY-A; thus, it is assumed that transmission of a beacon frame of the AP consists of transmission of a beacon frame based on the PHY-A and PHY-B. The contents carried by the individual beacon frames using different PHYs can be the same to each other, and can be transmitted with the same period but different offsets.

The BSS can include STAs which support both the PHY-A and the PHY-B represented by STA3 and STA4; each STA receives a decodable beacon frame depending on its location as it moves, and changes PHYs used for transmitting and receiving a frame. For example, STA3 can enter the coverage A and listens to a beacon frame based on the PHY-A and perform frame transmission/reception based on the PHY-A. In the case of STA4, it is located inside the coverage B, which is beyond the coverage A, and can receive such a beacon frame based only on the PHY-B and perform frame transmission/reception based on the PHY-B.

In what follows, for the convenience of description, it is assumed that the PHY-A, which supports a short transmission range and a high transmission rate, constitutes a basic configuration of the PHY structure for the STAs within the BSS. The AP has to transmit beacon frames based respectively on the PHY-A and PHY-B. Suppose the PHY-B is the default PHY, and STAs within the BSS and associated with the AP support both the PHY-A and the PHY-B. Then it is possible to make the AP support transmission of a beacon frame based only on the PHY-B.

Figure 5:
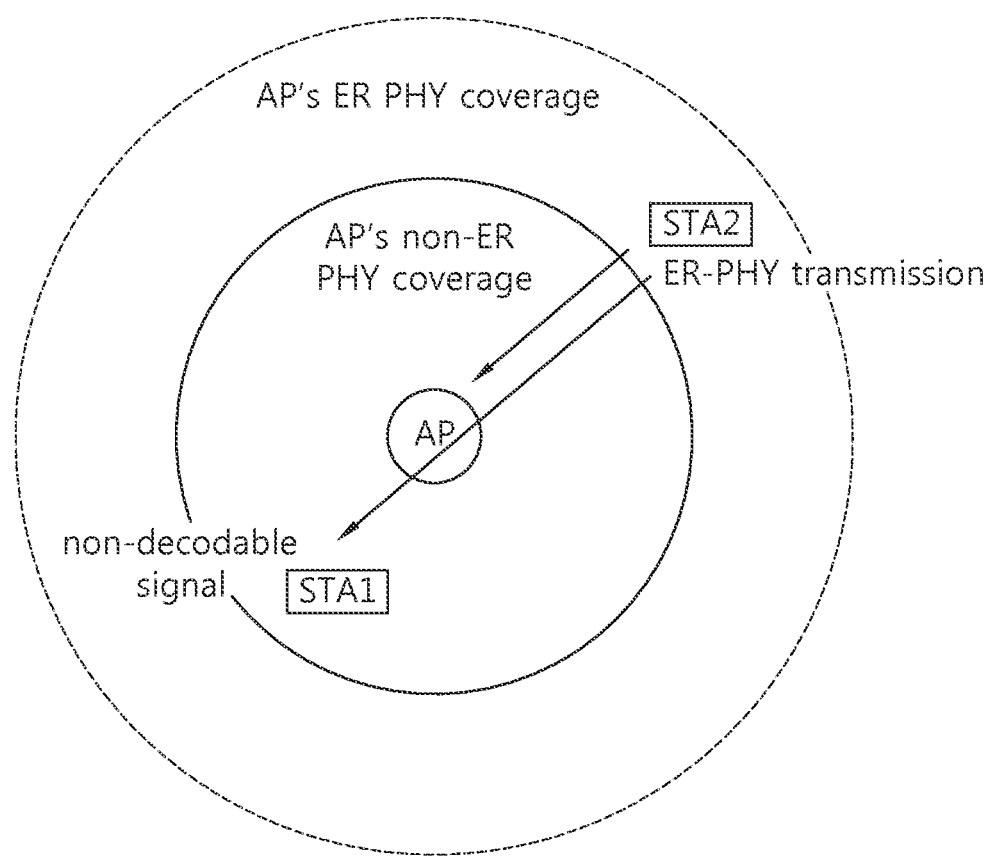
FIG. 5 illustrates a problem that can occur when multiple STAs utilizing multiple physical layers co-exist.

FIG. 5 illustrates a problem that can occur when multiple STAs utilizing multiple physical layers co-exist. The same as in the example of FIG. 4, it is assumed that two PHYs of PHY-A and PHY-B co-exist; the AP supports both the two PHYs; and the PHY-A which supports a short transmission range and a high transmission rate, is a default configuration. In this case, as described earlier, a beacon frame is transmitted separately by using the PHY-A and PHY-B. The PHY-B is such a physical layer that provides a relatively low transmission rate but a much larger transmission range to extend the coverage of the AP, and can be employed by the individual STAs. In what follows, the PHY-B is called an ER (Extended Range) PHY supporting a particularly extended transmission range, and the default PHY-A is called a non-ER PHY, to be distinguished from the ER PHY.

In the example of FIG. 5, a circle represented by a solid line denotes an available coverage of the AP when the AP performs frame transmission based on the non-ER PHY. Also shown is STA1 belonging to the corresponding coverage area. In case the AP performs frame transmission by using the ER PHY, the original coverage of the AP can be extended up to the area indicated by a dotted line. Also shown is STA2 belonging to the extended coverage area. In the example of FIG. 5, it is assumed that the STA1 is able to receive and decode a frame transmitted based only on the non-ER PHY and the STA2 is able to decode not only a frame transmitted based on the non-ER PHY but also a frame transmitted based on the ER PHY.

Under the situation above, if the STA2 transmits a frame based on the ER-PHY for communication with the AP, the STA1 cannot perform decoding of the corresponding frame. Because of this, the STA1 gets into a problem that the STA1 is unable to carry out various control messages transmitted by ER-PHY. As one example to describe the problematic situation, there exists an STA incapable of decoding a Request To Send (RTS) frame and a Clear To Send (CTS) frame transmitted by the ER-PHY, and the STA may cause a hidden node problem as the STA becomes unable to configure a network allocation vector (NAV).

To solve the problem above, according to an embodiment of the present invention, regarding an ER-RTS frame transmitted by the ER-PHY, the STA responding to the ER-CTS frame may transmit a non-ER CTS-to-self frame in addition to the ER-CTS frame. The non-ER CTS-to-self frame is a frame prepared by the AP for STAs supporting only the non-ER PHY belonging to the non-ER coverage. The non-ER STAs receiving the non-ER CTS-to-self frame can configure the NAV during a time duration specified in the corresponding non-ER CTS-to-self frame.

Figure 6:
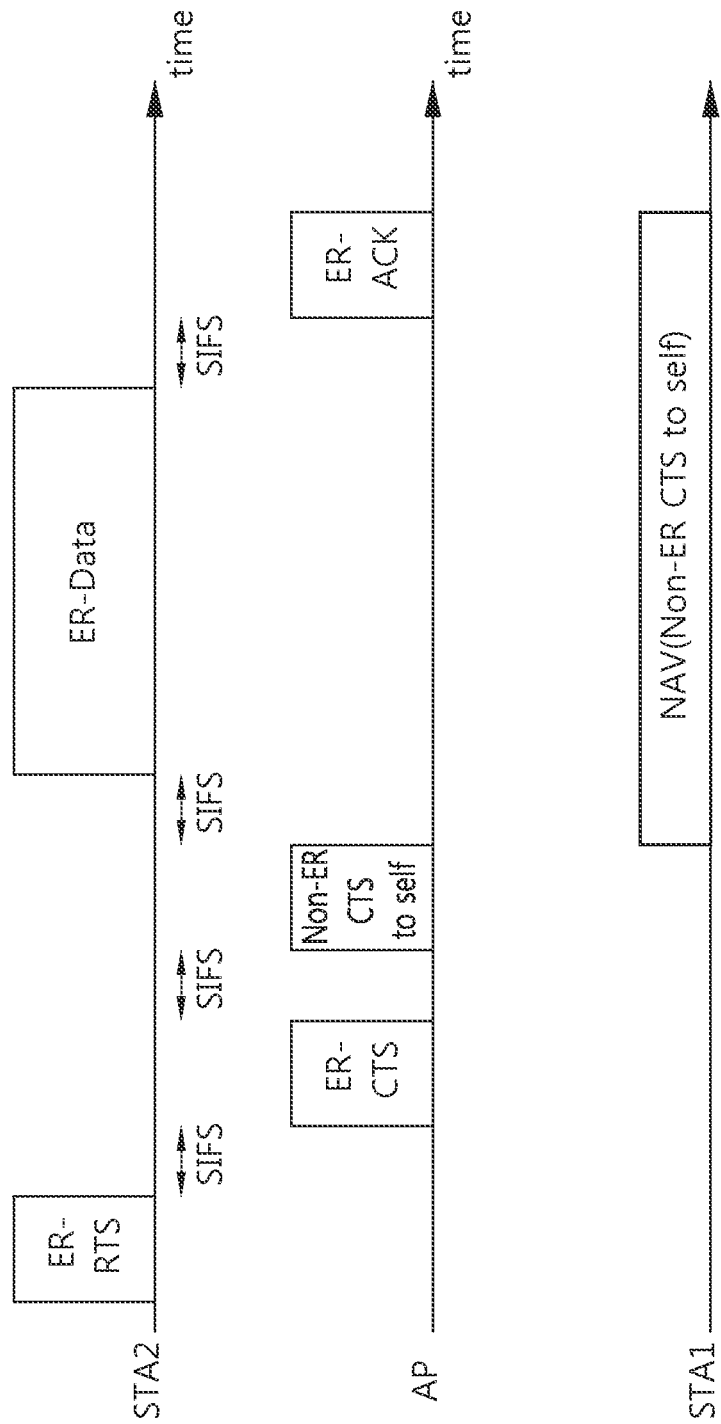
FIG. 6 illustrates one embodiment of the present invention according to time flow.

FIG. 6 illustrates one embodiment of the present invention according to time flow. The example of FIG. 6 is related to a case where the STA2 transmits an ER-RTS frame. In case the STA2 belonging to the extended coverage area transmits the ER-RTS frame to communicate with the AP, the AP makes a response by using an ER-CTS frame after SIFS period. However, since the STA1 supporting only the non-ER PHY is unable to decode the ER-CTS frame of the AP, the STA1 cannot configure the NAV through the ER-CTS frame. According to an embodiment of the present invention, the AP may transmit a non-ER CTS-to-self frame when the SIFS period is passed after the ER-CTS frame is transmitted. The STA1 can configure the NAV through the non-ER CTS-to-self frame. Subsequently, the STA2 transmits the ER-Data frame. At this time, transmission time of the ER-Data frame may be determined after [SIFS+"length of non-ER CTS-to-self"+SIFS] from the moment the AP receives the ER-CTS frame.

The length of the non-ER CTS-to-self frame is fixed, and this fact is informed beforehand to all of STAs supporting the ER PHY, whereby the STA2 belonging to the extended coverage area may fail to listen to the non-ER CTS-to-self frame. Even in that case, there will be no problem to start transmission of the ER-Data frame at the corresponding transmission time. Next, the AP makes a response by using ER-ACK after the SIFS period and the procedure for transmitting the ER-Data frame from the STA2 is completed.

For the sake of a transmitter transmitting the ER-Data, with regard to the time at which the ER-Data is transmitted, it is equally applicable to determine in advance the transmission of the ER-Data frame to be carried out at "(SIFS)+(length of non-ER CTS-to-self)+(SIFS)" right after transmission of the ER-CTS frame. Besides, it is still possible to apply such a method that the STA which has received the ER-RTS frame informs the transmitter explicitly that the non-ER CTS-to-self frame will be transmitted one more time by using a particular indicator bit within the ER-CTS frame. As one example, if a one-bit indicator is prepared in the ER-CTS frame and the corresponding bit is set to '1', it corresponds to commanding the non-ER CTS-to-self frame one more time subsequent to the ER-CTS frame whereas it corresponds to preventing additional transmission of the non-ET CTS frame when the indicator bit is '0'. In this embodiment, transmission time of the ER-Data frame for the transmitter may develop a difference as much as "(length of non-ER CTS-to-self)+(SIFS)" depending on the setting of the indicator bit.

Figure 7:
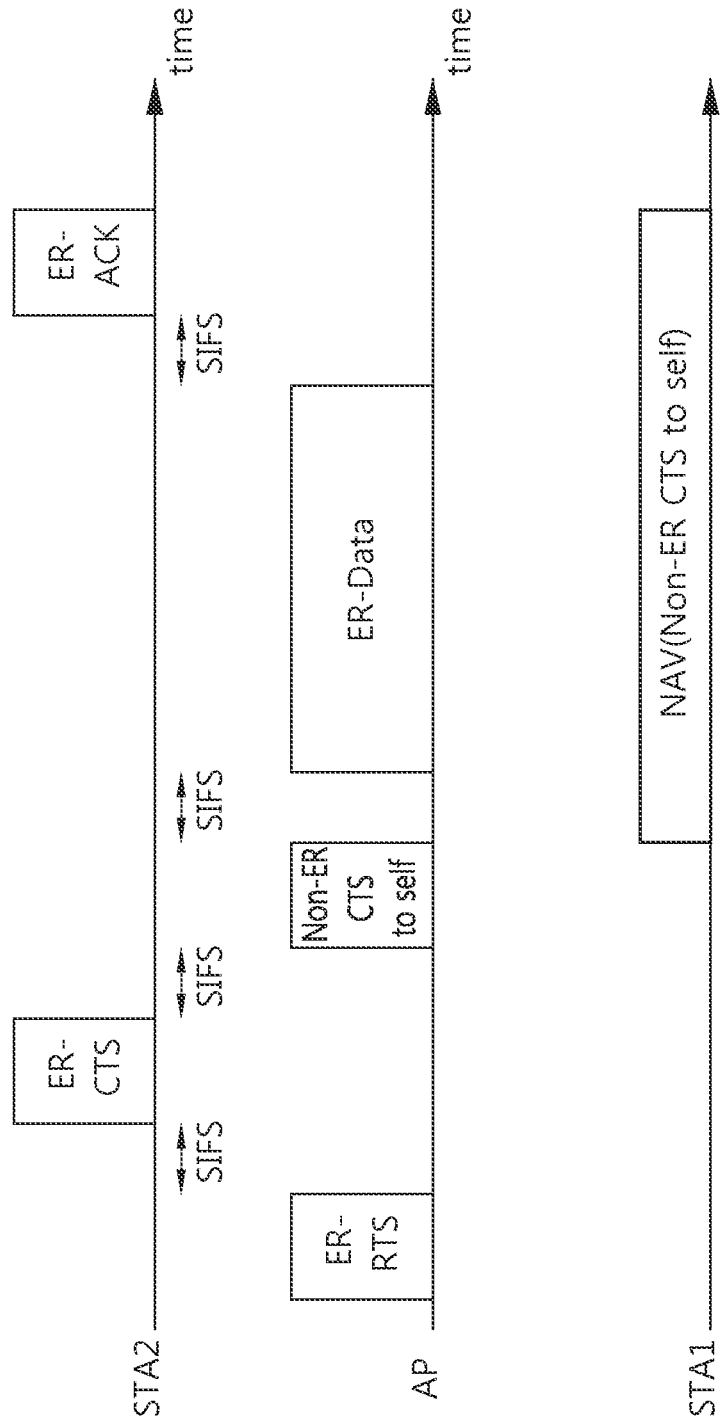
FIG. 7 is an embodiment of a case where an AP transmits an ER-RTS frame.

FIG. 7 is an embodiment of a case where an AP transmits an ER-RTS frame. In case the AP transmits the ER-RTS frame to communicate with the STA2 belonging to the extended coverage area, the STA2 may makes a response by using the ER-CTS frame after the SIFS period. However, since this signal cannot be recognized by the STA1 which supports the non-ER PHY only, the STA1 cannot configure the NAV through the ER-CTS frame. Therefore, the AP transmits the non-ER CTS-to-self frame again after another SIFS period, and the STA1 which receives the non-ER CTS-to-self frame can configure the NAV. The AP transmits the ER-Data frame after a yet another SIFS period, and the STA2 makes a response again after the SIFS period by using the ER-ACK, whereby the procedure for transmitting the ER-Data frame from the AP is completed.

Figure 8:
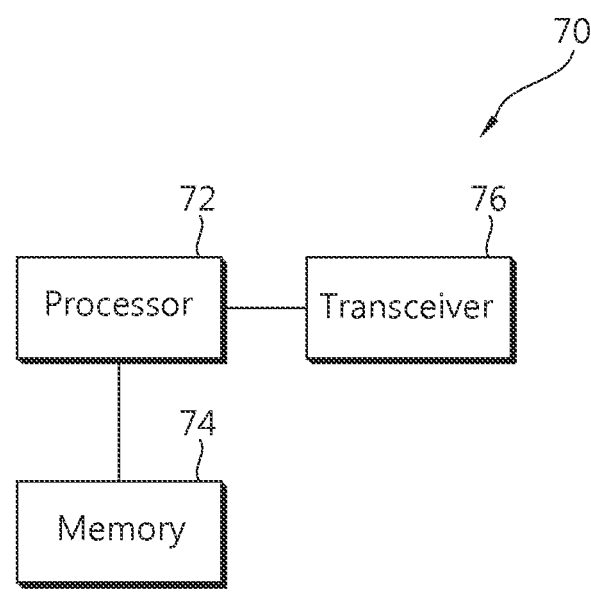
FIG. 8 is a block diagram of a wireless device to which an embodiment of the present invention can be applied.

FIG. 8 is a block diagram of a wireless device to which an embodiment of the present invention can be applied. The wireless device 70 is a terminal in which the embodiments described above can be implemented, and it can be an AP or a non-AP station.

The wireless device 70 comprises a processor 72, a memory 74, and a transceiver 76. The transceiver 76 transmits and receives a wireless signal, implementing the physical layer compliant with the IEEE 802.11 standards. The processor 72, being connected with the transceiver 76 functionally, implements the MAC layer and a plurality of physical layers of the IEEE 802.11. The processor 72 can be configured to generate and transmit a frame for supporting a method for transmitting a frame according to the present invention, or can obtain information required for transmission and reception of a frame proposed by the present invention from the received frame. The processor 72 can be configured to implement the embodiments of the present invention described above.

The processor 72 and/or transceiver 76 can include ASIC (Application-Specific Integrated Circuit), other chipsets, logical circuits, and/or a data processing apparatus. The memory 74 can include ROM (Read-Only Memory), RAM (Random Access Memory), flash memory, memory card, storage medium, and/or other storage apparatus. In case embodiments are implemented in software, the method described above can be implemented in the form of a module (procedure, function, and the like) performing the aforementioned function. The module can be stored in the memory 74 and can be carried out by the processor 72. The memory 74 can be implemented inside or outside the processor 72 and can be connected to the processor 72 through various well-known means.

The embodiments of the present invention described in detail above should be interpreted as examples for illustrating the technical principles of the present invention, and it should not be interpreted that the technical principles are limited by the embodiments. The technical scope of the present invention should be determined by the appended claims of the present invention.

What is claimed is:

1. A method for transmitting a frame, which is carried out by a transmission station in a wireless LAN system supporting transmission and reception of a frame based on a first and a second physical layer, the method comprising:
    transmitting a Request To Send (RTS) frame to a reception station through a first physical layer of the transmission station;
    receiving a first Clear To Send (CTS) frame transmitted in response to the RTS frame by the reception station through a first physical layer of the reception station;
    transmitting a second CTS frame through a second physical layer of the transmission station; and
    transmitting a data frame through the first physical layer of the transmission station.

2. The method of claim 1, wherein the first CTS frame includes information about time required for transmission of the second CTS frame and the data frame.

3. The method of claim 1, wherein the second CTS frame includes information about time required for transmission of the data frame.

4. The method of claim 1, wherein the RTS frame includes transmission time information indicating the reception station about transmission time of the data frame.

5. The method of claim 4, wherein the transmission time information includes information about time required for transmission of the second CTS frame.

6. The method of claim 1, wherein the first and the second CTS frame are broadcast.

7. A transmission station which transmits a frame based on a first and a second physical layer, the transmission station comprising a processor, where the processor is configured to
    transmit a Request To Send (RTS) frame to a reception station through a first physical layer of the transmission station;
    receive a first Clear To Send (CTS) frame which is transmitted in response to the RTS frame by the reception station through a first physical layer of the reception station;

transmit a second CTS frame through a second physical layer of the transmission station; and transmit a data frame through the first physical layer of the transmission station.

8. The transmission station of claim 7, wherein the first CTS frame includes information about time required for transmission of the second CTS frame and the data frame.

9. The transmission station of claim 7, wherein the second CTS frame includes information about time required for transmission of the data frame.

* * * * *